May 8, 1934.  T. W. BIGGER  1,958,260

CONDUIT

Filed Feb. 1, 1933

Inventor:
Trafford W. Bigger,
by Charles E. Tullar
His Attorney.

Patented May 8, 1934

1,958,260

UNITED STATES PATENT OFFICE 1,958,260

CONDUIT

Trafford W. Bigger, Schenectady, N. Y., assignor to General Electric Company, a corporation of New York Application February 1, 1933, Serial No. 654,778

2 Claims. (Cl. 285—90)

The present invention relates to conduits or containers for conducting or containing a substance under high pressure and/or temperature, more particularly to conduits comprising sections or portions connected by means of flexible members, such as accordions, for permitting relative movement between the sections.

One object of the invention is to provide an improved construction and arrangement of conduits of the type specified. Another object of the invention is to provide an improved construction for an accordion.

Figure 1:
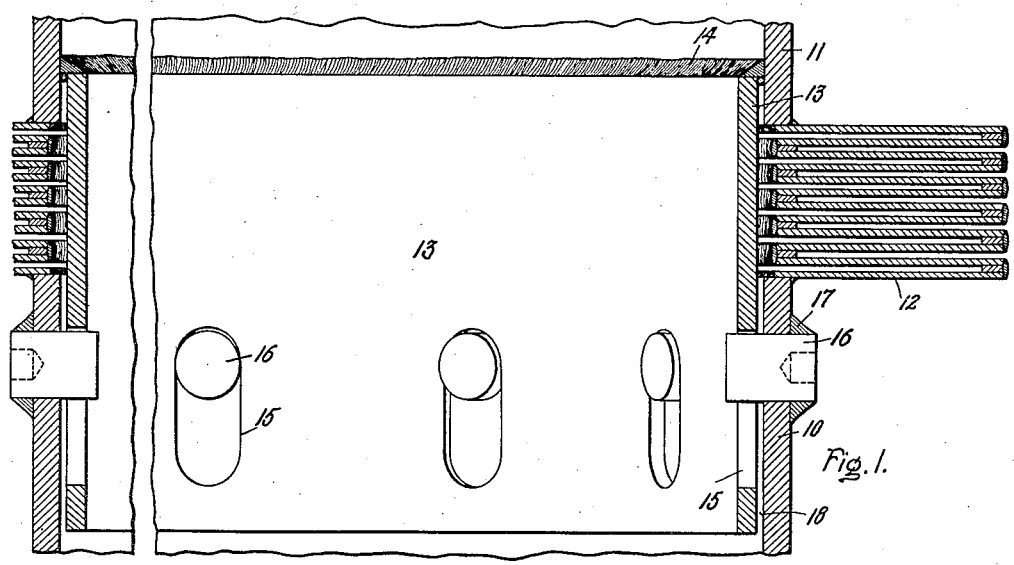
Figure 2:
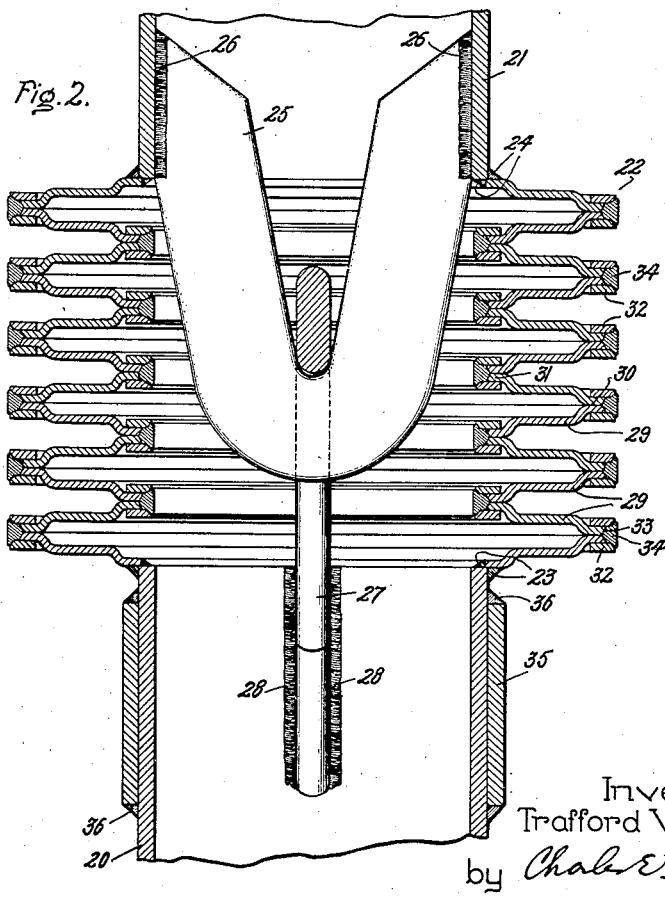

For a consideration of what I consider to be novel and my invention, attention is directed to the following description and the claims appended thereto in connection with the accompanying drawing in which Figs. 1 and 2 illustrate two conduit constructions embodying my invention.

Referring to Fig. 1, two conduits or conduit sections 10 and 11 are connected with each other by means of a flexible member or accordion 12 which may be of any suitable design, well known in the art. To prevent the conduits 10 and 11 from moving away from each other to an extent which would endanger the accordion, I provide in accordance with my invention in the interior of the conduits or conduit sections means for limiting the relative movement between the two conduits. In the present instance I have shown a member, more specifically a sleeve 13, in the interior of the conduits which at its upper end is fastened to the conduit 11 by a weld 14. The free end of the sleeve extends into the other conduit 10 and has a plurality of slots or openings 15. Pins or posts or studs 16 fastened to the conduit 10 by welds 17 project through the openings 15 of the sleeve. With this arrangement the two conduits are free to move in axial direction, the extent of movement being determined by the length of the slots and the width of the pins.

The outer diameter of the sleeve is somewhat smaller than the inner diameter of the conduits. The conduits and the sleeve thus form an annular space 18 which permits slight angular movement between the two conduits. In assembling the conduits, the sleeve 13 and the accordion 12 are first welded to conduit 11. The sleeve is then inserted in the other conduit 10 and the end of the latter is welded to the free end of the accordion. Thereafter the pins or studs 16 are inserted in holes or openings of the conduit 10 and united therewith by the welds 17.

Fig. 2 shows two conduits 20 and 21 connected by an accordion 22 which has its ends welded to the conduits by means of internal and external welds 23 and 24. A V- or U-shaped member or link 25 is provided in the interior of the structure with its legs fastened to the conduit 21 by welds 26. Another U or V-shaped member or link 27 has its ends fastened to conduit 20 by welds 28 and is in linked relationship with the first named member 25. From another viewpoint, the member 27 fastened to conduit 20 projects through a hole or recess of the member 25 which in turn is held by conduit 21.

Another important feature of the arrangement shown in Fig. 2 is the improved construction of the accordion, which is particularly adapted for heavy loads. The accordion comprises a plurality of annular plates or disks 29. Each plate has an outer portion 30 offset in one direction and an inner portion 31 offset in a direction opposite that of the outer portions. The offset portions of adjacent plates engage each other. To permit a thorough uniting of these offset portions I provide each offset portion with an extension, in the present instance shown as a ring 32 provided on the outside of the offset portion and projecting beyond the periphery of the annular plate. The rings provided on the engaging offset portion of adjacent plates define, together with the edges of the plates, an annular groove 33 for receiving welding material 34.

In assembling the structure, the end plates of the accordion are united with the corresponding conduits 20 and 21 by means of internal and external welds 23 and 24. Thereafter the members 25 and 27 are linked and the member 25 is welded to the conduit 21 by the welds 26. The accordion is then completed by providing the welds 34 between the outer offset portions of the upper and lower end plates or disks. Finally, link 27 is attached to conduit 20 by means of welds 28. The fastening of the link 27 to the conduit 20 may be accomplished by a weld in the interior of this conduit or in case the interior of the conduit is not easily accessible the fastening of the link 27 may be accomplished by providing slots on opposite sides of conduit 20 and welding the link 27 from outside the conduit 20 through these slots. In order to prevent the conduit 20 from flattening, that is, changing its circular shape into an elliptical shape due to heavy stresses imposed thereon through the link 27, I reinforce the conduit by providing an outer sleeve 35 fastened with its ends to the conduit by means of welds 36. In case the link 27 is welded to the conduit from without, that is through slots, I provide the reinforcing sleeve after the link 27 has been welded to the conduit 20. Similarly, a reinforcing sleeve may be provided for conduit 21 if found desirable.

The links 25 and 27 may be assembled either with lost motion between them to permit restricted elongation of the accordion in the direction of its axis, or without lost motion to prevent elongation of the accordion but permitting relative angular movement between the axes of the two conduits 20 and 21. The arrangement is not limited by the provision of two links only; any suitable number of links may be provided, depending upon the length of the accordion and the desired flexibility.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,—

1. The combination of two conduits, an accordion connecting the conduits to permit relative movement therebetween, a V-shaped member having its legs fastened to one conduit and another V-shaped member linked with the first-named member and having its legs fastened to the other conduit.

2. In an accordion, a plurality of annular plates, each pair of adjacent plates having offset portions engaging each other, an annular ring for each end portion projecting radially beyond the offset portion, the rings of adjacent end portions defining annular grooves, and welding material filling the grooves.

TRAFFORD W. BIGGER.